United States Patent
Kuramochi et al.

(10) Patent No.: US 9,701,334 B2
(45) Date of Patent: Jul. 11, 2017

(54) VEHICLE STEERING DEVICE

(71) Applicant: HONDA MOTOR CO., LTD, Tokyo (JP)

(72) Inventors: Toshikatsu Kuramochi, Wako (JP); Norio Yamazaki, Wako (JP); Munetsugu Hanji, Wako (JP); Kenichi Nakajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/600,204

(22) Filed: Jan. 20, 2015

(65) Prior Publication Data

US 2015/0203147 A1   Jul. 23, 2015

(30) Foreign Application Priority Data

Jan. 20, 2014 (JP) ................................ 2014-008028

(51) Int. Cl.
*B62D 5/04* (2006.01)
*B62D 5/00* (2006.01)
*B62D 6/00* (2006.01)

(52) U.S. Cl.
CPC ............ *B62D 5/001* (2013.01); *B62D 5/008* (2013.01); *B62D 5/0463* (2013.01); *B62D 5/0496* (2013.01); *B62D 6/008* (2013.01)

(58) Field of Classification Search
CPC ...... B62D 5/0496; B62D 6/008; B62D 5/003; B62D 5/0484
See application file for complete search history.

(56) References Cited

U.S. PATENT DOCUMENTS

| | | | |
|---|---|---|---|
| 2001/0002451 A1* | 5/2001 | Breed | B60C 11/24 701/36 |
| 2007/0205040 A1* | 9/2007 | Miyasaka | B62D 5/001 180/444 |
| 2008/0230302 A1* | 9/2008 | Tamaki | B62D 5/0463 180/443 |
| 2013/0285587 A1* | 10/2013 | Takemoto | B62D 5/0496 318/473 |

FOREIGN PATENT DOCUMENTS

JP   2010-132036 A   6/2010

OTHER PUBLICATIONS

Japanese Office Action dated Nov. 10, 2015 (mailing date), issued in counterpart Japanese Patent Application No. 2014-008028 with English translation.

* cited by examiner

*Primary Examiner* — Yuen Wong
(74) *Attorney, Agent, or Firm* — Westerman, Hattori, Daniels & Adrian, LLP (57) ABSTRACT

A vehicle steering device includes a steering wheel operated by a driver to steer a vehicle; a steering reaction force motor that applies a reaction force to the steering wheel; a turning device that turns turning wheels of the vehicle by a turning motor; a clutch mechanism that mechanically connects and disconnects the steering wheel with and from the turning device; a control device that provides control so that a turning angle is based on a steering angle of the steering wheel; and a temperature sensor that measures a temperature. The vehicle steering device mechanically couples the steering wheel and the turning device and activates the steering wheel and the turning device if the temperature is a predetermined value or lower.

16 Claims, 3 Drawing Sheets

FIG. 1

VEHICLE STEERING DEVICE

CROSS REFERENCES TO RELATED APPLICATIONS

The present application claims priority under 35 U.S.C. §119 to Japanese Patent Application No. 2014-008028, filed Jan. 20, 2014, entitled "Vehicle Steering Device." The contents of this application are incorporated herein by reference in their entirety.

TECHNICAL FIELD

The present disclosure relates to a vehicle steering device of steer-by-wire system.

BACKGROUND

In recent years, a steering device of a system called steer by wire (SBW) is being developed instead of a steering device of mechanical steering system. In the mechanical steering system, a steering wheel is mechanically coupled with tires. Owing to this, a vibration or a swing due to irregularities of a road surface may be transmitted to the steering wheel. To correct the influence of the vibration or the swing, a driver unconsciously operates the steering wheel. This may cause stress or tiredness during driving.

In contrast, in the steer by wire system, a steering wheel is not mechanically coupled with tires, and steering by the steering wheel and change of a turning angle of the tires are individually controlled. A steering device detects steering by the steering wheel with a sensor, and transmits a control signal calculated based on sensor information to a turning motor that controls the turning angle of the tires through a wire harness. The turning motor turns the tires by driving a turning mechanism. With the steering device of the steer by wire system, a vibration or a swing due to irregularities of a road surface is not transmitted to the steering wheel. Accordingly, stress or tiredness during driving is reduced.

In preparation for occurrence of an error in the control signal of the steer by wire system, in many cases, the steering device may switch a system between the steer by wire system and the mechanical steering system. If an error occurs in the steer by wire system, the steering device causes the steering wheel to be mechanically coupled with the turning mechanism by a clutch mechanism, switches the system to the mechanical steering system, and hence allows a steering operation to be executed.

The steering device of the steer by wire system has a problem in which the viscosity of grease in a turning gear box increases and the friction of the turning gear box increases at low temperatures.

Also, there is suggested a technology described in Japanese Unexamined Patent Application Publication No. 2010-132036 (hereinafter, referred to as document '036). Abstract of the document '036 describes a configuration that "in a turning device 12 in which a nut 44 formed with a female screw is thread-engaged with a male screw formed on a turning rod 32 and a rotation force is given to the nut by a motor, a material having a larger linear expansion coefficient than an inner race 52 of a bearing 50 for retaining the nut and the steering rod is used for the nut, and a pressure-fitting margin of the nut to the inner race and a clearance of the male screw and the female screw are adjusted such that the pressure-fitting margin does not become 0 and the clearance does not become 0 even at the lowest use allowance temperature." Also, Abstract of the document '036 describes an advantageous effect that "a contraction amount difference of an outer diameter of the nut and an inner diameter of the inner race by temperature variation and a contraction amount difference of the male screw and the female screw are compensated to absorb variation of the clearance, and even at the lowest use allowance temperature, therefore, the nut is firmly retained to the inner race and smooth relative action of the nut and the steering rod is ensured."

However, a variation in dimension of parts forming the turning gear box has to be considered. It is difficult to provide stable quality for all products.

Regarding the steering device with the steer by wire system of related art, if the viscosity of the grease in the turning gear box increases and the friction increases at low temperatures, a deviation between a target turning angle and an actual turning angle increases, and hence control performance may decrease. Also, if the friction of the turning gear box becomes a value of a turning torque of the turning motor or higher, turning itself may be obstructed.

In this case, the steering device causes the clutch mechanism to mechanically couple the steering wheel with the turning mechanism, and the mode is shifted to, for example, an electronic power steering (EPS) mode or a manual steering mode to allow turning. However, if the mode is changed such that activation is executed with the SBW mode, and then the mode is shifted to the EPS mode immediately, the change may give the driver uncomfortable feeling.

SUMMARY

It is desirable to provide a vehicle steering device that can provide steering without giving a driver uncomfortable feeling even at low temperatures.

To address the above-described problem, an aspect (1) of this disclosure provides a vehicle steering device including a steering member operated by a driver to steer a vehicle; a reaction force motor that applies a reaction force to the steering member; a turning mechanism that turns turning wheels of the vehicle by a turning motor; a clutch mechanism that mechanically connects and disconnects the steering member with and from the turning mechanism; a control unit that provides control so that a turning angle is based on a steering angle of the steering member; and a temperature acquisition section that can acquire a temperature by measuring or estimating the temperature. A major feature is that, if the temperature is a predetermined value or lower, the steering member and the turning mechanism are mechanically coupled and activated.

With the aspect (1) of this disclosure, since the steering member and the turning mechanism are mechanically coupled and activated if the temperature is the predetermined value or lower, steering can be executed even at low temperatures without giving a driver uncomfortable feeling.

Also, in an aspect (2) of this disclosure, based on the aspect (1), a major feature may be that the temperature acquisition section includes a temperature measurement unit connected with the control unit.

With the aspect (2), the temperature measurement unit can directly measure the temperature.

Also, in an aspect (3) of this disclosure, based on the aspect (1), a major feature may be that the temperature acquisition section acquires the temperature by estimating the temperature based on any of temperature information of an external thermometer, air-conditioner operation information, seat-heater temperature rise characteristic information, tire pressure information, information of a tire pressure monitoring system (TPMS), information of a navigation device, and information received through the Internet.

With the aspect (3) of this disclosure, since information while ignition of the vehicle is turned OFF can be also acquired, the temperature can be estimated more objectively.

Also, in an aspect (4) of this disclosure, based on any of the aspects (1) to (3), a major feature may be that, if a state, in which the temperature acquired by the temperature acquisition section is the predetermined value or lower, continues for a predetermined time or longer, the steering member and the turning mechanism are mechanically coupled and activated.

With the aspect (4) of this disclosure, by checking that the temperature of the predetermined value or lower continues for the predetermined time or longer, it can be more accurately estimated that the friction of the turning mechanism of the vehicle has become low.

Also, in an aspect (5) of this disclosure, based on any of the aspects (1) to (4), a major feature may be that, after the steering member and the turning mechanism are mechanically coupled and activated, if the temperature acquired by the temperature acquisition section exceeds the predetermined value, an operation mode is shifted to a SBW mode in which the steering member and the turning mechanism are not mechanically coupled.

With the aspect (5) of this disclosure, the operation mode can be shifted to the SBW mode if the friction of the turning mechanism of the vehicle has become low.

Also, in an aspect (6) of this disclosure, based on any of the aspects (1) to (5), a major feature may be of further including a turning motor current detection unit that detects a current value of the turning motor. Another major feature may be that, after the steering member and the turning mechanism are mechanically coupled and activated, if a current integrated value of the turning motor becomes a predetermined value or larger, an operation mode is shifted to a SBW mode in which the steering member and the turning mechanism are not mechanically coupled.

With the aspect (6) of this disclosure, since an amount of heat applied to grease in the turning mechanism of the vehicle is estimated by using the current integrated value of the turning motor, it can be determined that the viscosity of the grease has become sufficiently low. Accordingly, it can be determined that the friction of the turning mechanism of the vehicle has become low.

Also, in an aspect (7) of this disclosure, based on any of the aspects (1) to (6), a major feature may be that the activation while the steering member and the turning mechanism are mechanically coupled represents activation in an EPS mode.

With the aspect (7) of this disclosure, since the activation is executed in the EPS mode at low temperatures, steering with the steering member can be executed regardless of the viscosity of the grease in the turning mechanism of the vehicle. Further, by driving the turning motor, heat can be applied to the grease in the turning mechanism of the vehicle, and hence the viscosity of the grease can be rapidly decreased.

Also, in an aspect (8) of this disclosure, based on the aspect (7), a major feature may be that at least two motors are driven in the EPS mode.

With the aspect (8) of this disclosure, since the at least two motors are driven in the EPS mode, steering with the steering wheel can be executed with high power regardless of the viscosity of the grease in the turning mechanism of the vehicle. Further, by driving the at least two motors, heat can be applied by a larger amount to the grease in the turning mechanism of the vehicle, and hence the viscosity of the grease can be rapidly decreased.

Also, in an aspect (9) of this disclosure, based on the aspect (8), a major feature may be of further including a reaction force motor current detection unit that detects a current value of the reaction force motor. Another major feature may be that, after the steering member and the turning mechanism are mechanically coupled and activated, the reaction force motor is driven in the EPS mode, and if a current integrated value of the reaction force motor is increased to a predetermined value, an operation mode is shifted to a SBW mode in which the steering member and the turning mechanism are not mechanically coupled.

With the aspect (9) of this disclosure, since the amount of heat applied to the grease in the turning mechanism of the vehicle is estimated also by using the current integrated value of the reaction force motor, it can be determined that the viscosity of the grease has become sufficiently low.

With this disclosure, the vehicle steering device that can provide steering without giving the driver uncomfortable feeling even at low temperatures can be provided.

BRIEF DESCRIPTION OF THE DRAWINGS

The advantages of the disclosure will become apparent in the following description taken in conjunction with the following drawings.

DETAILED DESCRIPTION

Embodiments of this disclosure are described below with reference to accompanying drawings.

Components in the drawings may be occasionally illustrated in an enlarged manner, a contracted manner, or a simplified manner for easier understanding of the disclosure.

First Embodiment

Figure 1:
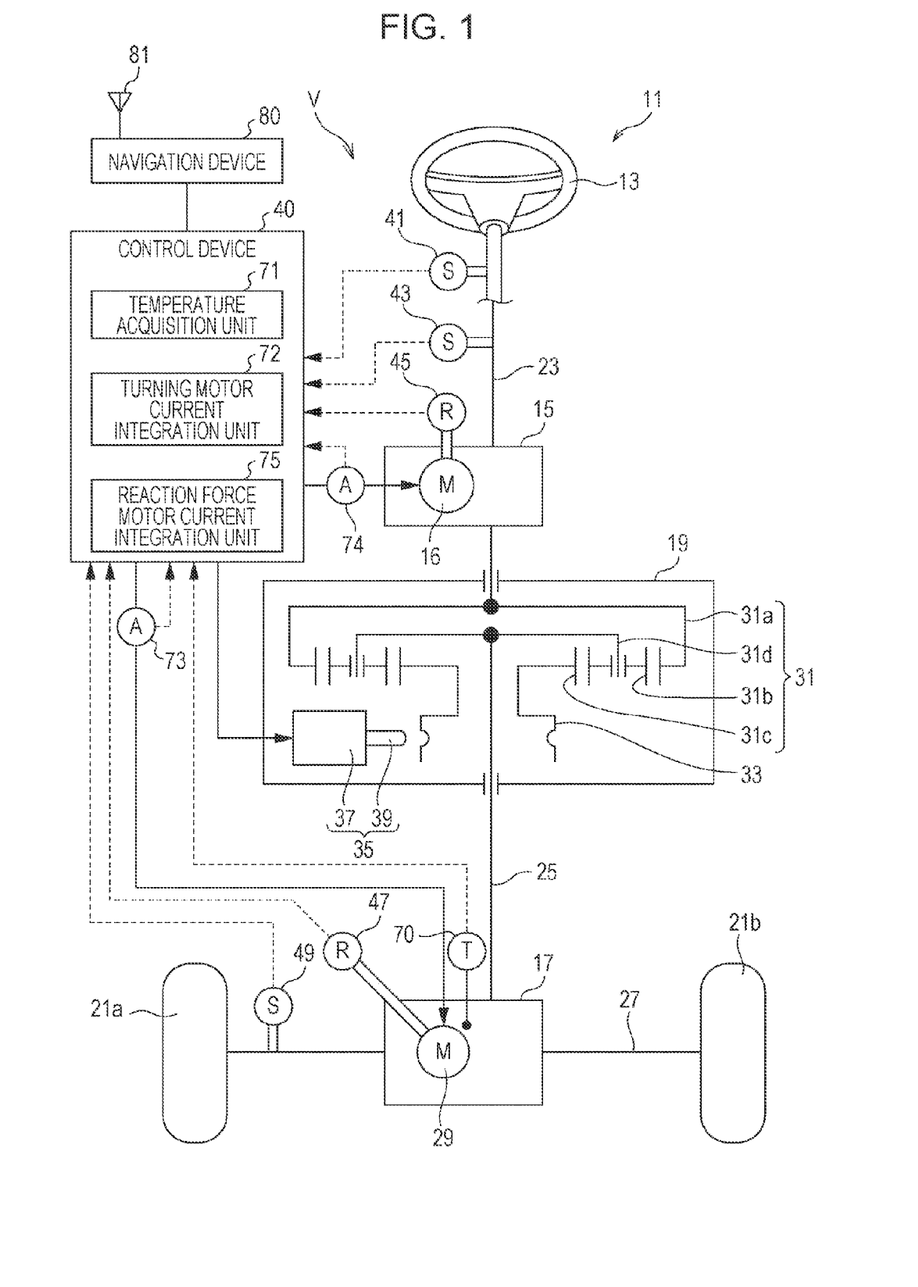
FIG. 1 is a configuration diagram of an overview of a vehicle steering device of an embodiment.

FIG. 1 is a configuration diagram of an overview of a vehicle steering device 11.

The vehicle steering device 11 is a steering device of steer by wire (SBW) system. This vehicle steering device 11 has, as its operation mode, a SBW mode, an EPS mode, and a manual steering mode.

In the SBW mode, a turning force is generated by driving of a turning motor 29 (described later). The vehicle steering device 11 normally operates in the SBW mode to prevent a vibration or a swing of a steering wheel 13 from occurring due to irregularities of a road surface. In the SBW mode, a steering characteristic can be changed in accordance with a vehicle speed. For example, the steering characteristic can be quicker at lower speed, and slower at higher speed.

In the EPS mode, an auxiliary force is generated for manual steering of a driver, by driving of the turning motor 29. The EPS mode is also called electrically operated power steering mode. The vehicle steering device 11 is shifted to the EPS mode if an error occurs in the SBW mode.

In the manual steering mode, manual steering is executed by the driver. The vehicle steering device 11 shifts the mode to the manual steering mode if a steering reaction force motor 16 and the turning motor 29 are failed in the EPS mode. In the manual steering mode, an assist by a motor is not obtained. In the drawings, the manual steering mode may be occasionally merely described as "manual mode."

To provide these modes, the vehicle steering device 11 includes the steering wheel 13, a steering reaction force generation device 15, a turning device 17, and a clutch mechanism 19 as shown in FIG. 1. The vehicle steering device 11 is mounted on a vehicle V. The vehicle V includes a pair of turning wheels 21a and 21b.

The steering wheel 13 is a member that is operated in accordance with an intention for driving so that the driver steers the vehicle V. The steering wheel 13 corresponds to a "steering member" of this disclosure. The steering wheel 13 is provided with a steering shaft 23. The steering shaft 23 rotates on its axis in accordance with an operation of the steering wheel 13 by the driver. The steering wheel 13 may be occasionally merely described as "steering" in the drawing.

The steering reaction force generation device 15 has a function of generating a reaction force (resistance) for steering applied to the hands of the driver who grips the steering wheel 13 when the vehicle steering device 11 operates in the SBW mode. The steering reaction force generation device 15 includes the steering reaction force motor 16. The steering reaction force motor 16 is coupled with the steering shaft 23.

The steering reaction force motor 16 generates a steering torque for rotating the steering shaft 23 on its axis. Accordingly, when the vehicle steering device 11 operates in the SBW mode, a reaction force (resistance) for steering is transmitted to the hands of the driver who grips the steering wheel 13. Further, the steering reaction force motor 16 is connected with a current sensor 74 that detects a current value of current flowing to the steering reaction force motor 16.

The turning device 17 has a function of converting a rotational motion of a turning shaft 25 into a linear motion of a rack shaft 27 through a rack and pinion mechanism (not shown). The turning device 17 corresponds to a "turning mechanism" of this disclosure, and turns the turning wheels 21a and 21b of the vehicle V by the turning motor 29. The turning device 17 includes the turning motor 29 and a turning gear box with grease sealed therein.

The turning motor 29 is coupled with the turning shaft 25 and the rack shaft 27. The turning motor 29 generates a turning torque for linearly moving the rack shaft 27 along the axial direction. The turning motor 29 is connected with a current sensor 73 that detects a current value of current flowing to the turning motor 29.

The viscosity of the grease in the turning device 17 increases and the friction of the turning device 17 increases at low temperatures. If the friction of the turning device 17 increases, it is difficult to drive the turning shaft 25 and the rack shaft 27 by the turning motor 29. A deviation between a target turning angle and an actual turning angle increases, and control performance decreases. Also, a load of the turning motor 29 increases.

The rack shaft 27 is coupled with the pair of turning wheels 21a and 21b through tie rods (not shown). The pair of turning wheels 21a and 21b are turned by the linear motion of the rack shaft 27.

The turning device 17 having the turning shaft 25, the rack shaft 27, and the turning motor 29 corresponds to a "turning mechanism" in this disclosure.

The clutch mechanism 19 has a function of mechanically coupling the steering shaft 23 with the turning shaft 25, or separating the steering shaft 23 from the turning shaft 25. Thus, the clutch mechanism 19 mechanically connects and disconnects the steering wheel 13 with and from the turning device 17. To provide the function, the clutch mechanism 19 includes a planetary gear mechanism 31. The planetary gear mechanism 31 includes an internal gear 31a, a planetary gear 31b, a sun gear 31c, and a planetary carrier 31d.

Also, the clutch mechanism 19 includes a lock gear 33 and a lock device 35. The lock device 35 includes a lock pin 39 that is engaged with a tooth groove of the lock gear 33, and an electromagnetic solenoid 37 that drives the lock pin 39.

The internal gear 31a is fixed to an end portion at the turning device 17 side of the steering shaft 23, and integrally rotates with the steering shaft 23. The sun gear 31c freely rotates around a rotation axis being coaxial with the turning shaft 25. A plurality of the planetary gears 31b are provided to be respectively engaged with the sun gear 31c and the internal gear 31a. The plurality of planetary gears 31b are supported rotatably relative to the planetary carrier 31d that rotates integrally with the turning shaft 25.

The lock gear 33 is an external gear. The lock gear 33 rotates integrally with the sun gear 31c. The lock pin 39 is urged in a direction toward the lock gear 33 by an urging member (not shown). The rotational motion of the lock gear 33 is restricted when the lock pin 39 is engaged with the tooth groove of the lock gear 33.

The electromagnetic solenoid 37 operates to disengage the lock pin 39 from the lock gear 33 by displacing the lock pin 39 so as to be retracted by supply of excitation current.

The lock device 35 operates in accordance with a control signal transmitted from a control device 40. The control device 40 disengages the lock pin 39 from the lock gear 33 by supplying excitation current to the electromagnetic solenoid 37.

Next, an operation of the clutch mechanism 19 is described. When the lock pin 39 is engaged with the tooth groove of the lock gear 33, the rotational motion of the sun gear 31c that rotates integrally with the lock gear 33 is restricted.

If the driver operates the steering wheel 13 while the rotational motion of the sun gear 31c is restricted, the internal gear 31a rotates by the rotation of the steering shaft 23. At this time, since the rotational motion of the sun gear 31c is restricted, the planetary gear 31b revolves around the sun gear 31c while the planetary gear 31b rotates on its axis. By the revolution of the planetary gear 31b, the planetary carrier 31d that rotatably supports the planetary gear 31b and the turning shaft 25 that rotates integrally with the planetary carrier 31d rotate.

That is, while the lock pin 39 is engaged with the tooth groove of the lock gear 33, the clutch mechanism 19 is in a coupling state in which the clutch mechanism 19 couples the steering shaft 23 with the turning shaft 25. At this time, the rotational force of the steering shaft 23 is transmitted to the turning shaft 25.

In contrast, if the lock pin 39 is disengaged from the tooth groove of the lock gear 33, the sun gear 31c that rotates integrally with the lock gear 33 becomes freely rotatable.

If the driver operates the steering wheel 13 while the sun gear 31c is freely rotatable, the internal gear 31a rotates by the rotation of the steering shaft 23. At this time, the planetary gear 31b attempts to revolve around the sun gear 31c while rotating on its axis. However, the planetary carrier 31d is coupled with the turning wheels 21a and 21b through the turning shaft 25 and the rack shaft 27. Owing to this, the resistance to the rotation of the planetary carrier 31d is markedly larger than the resistance to the rotation of the sun gear 31c in the freely rotatable state. Hence, when the planetary gear 31b rotates on its axis, the sun gear 31c rotates (rotates on its axis), but the planetary carrier 31d does not rotate. That is, the turning shaft 25 does not rotate.

That is, while the lock pin 39 is disengaged from the tooth groove of the lock gear 33, the clutch mechanism 19 does not mechanically couple the steering shaft 23 with the turning shaft 25, i.e., both the steering shaft 23 and the turning shaft 25 are separated from each other. At this time, the rotational force of the steering shaft 23 is not transmitted to the turning shaft 25.

Next, input and output systems for the control device 40 are described. The control device 40 corresponds to a "control unit" of this disclosure, and provides control so that the turning angle corresponds to or complies with the steering angle of the steering wheel 13. The control device 40 is connected with a steering angle sensor 41, a steering torque sensor 43, a steering reaction force motor resolver 45, a turning motor resolver 47, a rack stroke sensor 49, a temperature sensor 70, the current sensors 73 and 74, and a navigation device 80, as an input system.

The steering angle sensor 41 and the steering torque sensor 43 are provided at the steering shaft 23. The steering angle sensor 41 detects a steering angle of the steering wheel 13 by the driver, and gives detected steering angle information to the control device 40. Also, the steering torque sensor 43 detects a steering torque of the steering wheel 13 by the driver, and gives detected steering torque information to the control device 40.

The steering reaction force motor resolver 45 is provided at the steering reaction force motor 16. The steering reaction force motor resolver 45 detects a rotational operation amount (steering angle) of the steering reaction force motor 16, and gives detected steering angle information to the control device 40.

The turning motor resolver 47 is provided at the turning motor 29. The turning motor resolver 47 detects a rotational operation amount (turning angle) of the turning motor 29, and gives detected turning angle information to the control device 40.

The rack stroke sensor 49 is provided at the rack shaft 27. The rack stroke sensor 49 detects a linear motion amount (turning angle) of the rack shaft 27, and gives detected turning angle information to the control device 40.

The temperature sensor 70 is provided at the turning device 17. The temperature sensor 70 measures a temperature around the turning gear box, and gives its temperature information to the control device 40. The temperature sensor 70 corresponds to a "temperature measurement unit" of this disclosure, and is included in a "temperature acquisition section" of this disclosure.

The current sensor 73 detects a current value of current flowing to the turning motor 29, and gives its current value information to the control device 40. The current sensor 73 corresponds to a "turning motor current detection unit" of this disclosure.

The current sensor 74 detects a current value of current flowing to the steering reaction force motor 16, and gives its current value information to the control device 40. The current sensor 74 corresponds to a "reaction force motor current detection unit" of this disclosure.

The navigation device 80 provides a current position and a route guide to a destination during driving of the vehicle V. The navigation device 80 makes wireless communication with the Internet through an antenna 81. Accordingly, a temperature acquisition unit 71 can estimate and acquire an ambient temperature at the position where the vehicle V is placed by making an access to, for example, a distribution site of weather information.

Meanwhile, the control device 40 is connected with the steering reaction force motor 16, the turning motor 29, and the electromagnetic solenoid 37, as an output system.

The control device 40 has a first function to a third function described as follows.

The first function determines an operation mode of the vehicle steering device 11 whether the SBW mode, the EPS mode, or the manual steering mode, based on a detection signal input through the input system and abnormality diagnosis results for various components of the vehicle steering device 11.

The second function generates respective control signals for executing driving controls of the steering reaction force motor 16, the turning motor 29, and the electromagnetic solenoid 37, in accordance with the determined operation mode.

The third function executes the driving controls of the steering reaction force motor 16, the turning motor 29, and the electromagnetic solenoid 37, in accordance with the generated control signals.

The SBW mode is a normal mode. In the SBW mode, the steering wheel 13 is not mechanically coupled with the turning device 17. The EPS mode or the manual steering mode is a mode when a temperature is a predetermined value or lower. In the EPS mode or the manual steering mode, the steering wheel 13 is mechanically coupled with the turning device 17.

When the vehicle steering device 11 operates in the SBW mode, the control device 40 executes the driving control of the steering reaction force motor 16, to transmit a proper reaction force (resistance) for steering to the hands of the driver who grips the steering wheel 13.

Also, when the vehicle steering device 11 operates in the SBW mode, the control device 40 executes the driving control of the turning motor 29, to turn the turning wheels 21a and 21b in accordance with the intention for driving of the driver.

Further, the control device 40 executes driving control that switches a state between supply of excitation current to the electromagnetic solenoid 37 and stop of the supply in accordance with the operation mode of the vehicle steering device 11. Accordingly, the clutch mechanism 19 is switched to one of a coupling state and a separation state.

To be more specific, the control device 40 includes the temperature acquisition unit 71, a turning motor current integration unit 72, and a reaction motor current integration unit 75.

For example, if the temperature sensor 70 cannot measure a temperature, the temperature acquisition unit 71 estimates and acquires a temperature based on other information. In this case, the temperature is, for example, a temperature of grease sealed in the turning gear box of the turning device 17. The temperature acquisition unit 71 is included in the "temperature acquisition section" of this disclosure.

The turning motor current integration unit 72 calculates a current integrated value of current flowing to the turning motor 29 after activation in the EPS mode. The current integrated value of current flowing to the turning motor 29 is proportional to an amount of heat applied to the grease sealed in the turning gear box (not shown) of the turning device 17. Hence, the control device 40 estimates the temperature of the grease in the turning device 17 with reference to the temperature information at activation and the current integrated value of current flowing to the turning motor 29, and can determine whether or not the mode is switched to the SBW mode.

The reaction force motor current integration unit 75 calculates a current integrated value of current flowing to the steering reaction force motor 16 after activation in the EPS mode. The vehicle steering device 11 drives two motors of the turning motor 29 and the steering reaction force motor 16 in the EPS mode. Accordingly, the vehicle steering device 11 can provide steering with high power by a larger torque, as compared with driving with only the turning motor 29. At this time, the current integrated value of current flowing to the steering reaction force motor 16 is proportional to an amount of heat applied to the grease sealed in the turning gear box (not shown) of the turning device 17. Hence, the vehicle steering device 11 estimates the temperature of the grease in the turning device 17 also with reference to the temperature information at activation and the current integrated value of current flowing to the steering reaction force motor 16, and can determine whether or not the mode is to be switched to the SBW mode. The temperature information at activation is a temperature measured by the temperature sensor 70 or a temperature estimated by the temperature acquisition unit 71. The friction can be estimated by the temperature of the grease in the turning device 17.

Figure 2:
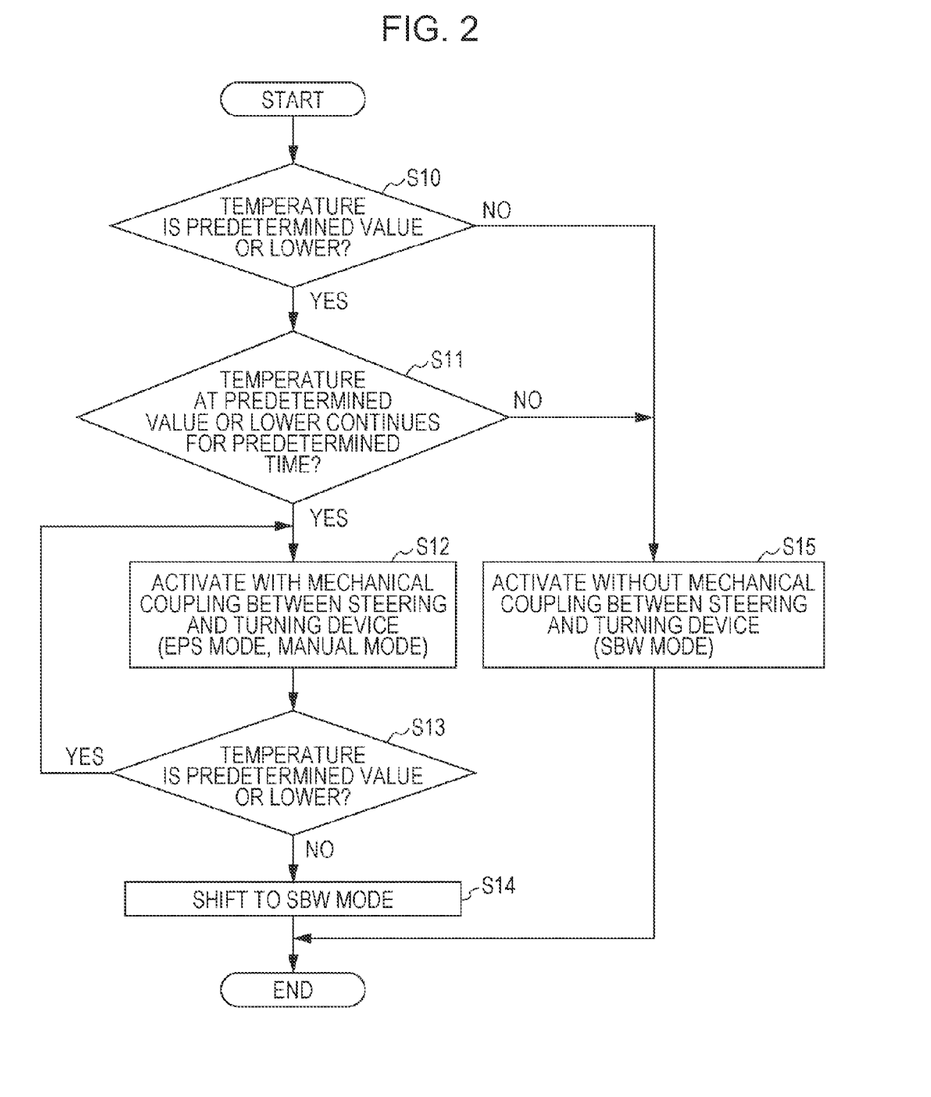
FIG. 2 is a flowchart showing an operation at activation according to a first embodiment.

FIG. 2 is a flowchart showing an operation at activation according to a first embodiment.

When ignition of the vehicle V is turned ON, the vehicle steering device 11 starts an operation at activation shown in FIG. 2.

In step S10, the control device 40 determines whether or not a temperature measured by the temperature sensor 70 is a predetermined value or lower.

If the temperature is the predetermined value or lower (YES), the control device 40 executes processing in step S11. If the temperature exceeds the predetermined temperature (NO), the control device 40 executes processing in step S15.

In step S11, the control device 40 determines whether or not the temperature of the predetermined value or lower continues for a predetermined time. If the temperature of the predetermined value or lower continues for the predetermined time (YES), the control device 40 executes processing in step S12. If this state does not continue for the predetermined time (NO), the control device 40 executes processing in step S15. By the processing in step S11, it can be more accurately estimated that the viscosity of the grease in the turning device 17 has become low.

In step S12, the control device 40 mechanically couples the steering wheel 13 with the turning device 17, and activates the steering wheel 13 and the turning device 17. At this time, the vehicle steering device 11 is activated in the EPS mode, and assists steering by driving the steering reaction force motor 16 in addition to the turning motor 29. Since the mode is not switched from the SBW mode to the EPS mode during steering, the driver does not feel uncomfortable. Also, since the activation is executed in the EPS mode, three torques in total including the torque of the turning motor 29, the torque of the steering reaction force motor 16, and a manual steering torque by the driver are added. The three torques overcome the resistance by the viscosity of the grease, and steering (turning) can be executed. Further, by driving the turning motor 29 and the steering reaction force motor 16, heat is applied by a larger amount to the grease in the turning device 17 of the vehicle V. Hence the viscosity of the grease can be rapidly decreased.

In step S13, the control device 40 determines whether or not the temperature measured by the temperature sensor 70 is a predetermined value or lower. If the temperature is the predetermined value or lower (YES), the control device 40 returns to processing in step S12. If the temperature exceeds the predetermined temperature (NO), the control device 40 executes processing in step S14.

In step S14, the control device 40 shifts the operation mode to the SBW mode, and ends the processing in FIG. 2.

In step S15, the control device 40 does not mechanically couple the steering wheel 13 with the turning device 17, activates the steering wheel 13 and the turning device 17 in the SBW mode, and ends the processing in FIG. 2.

With the processing in FIG. 2, the vehicle steering device 11 measures the temperature by the temperature sensor 70. If the temperature is the predetermined value or lower, the vehicle steering device 11 is activated in the EPS mode different from the normal SBW mode. Accordingly, steering can be executed even at low temperatures without giving the driver uncomfortable feeling. The vehicle steering device 11 can shift the operation mode to the SBW mode that is less affected by irregularities of a road surface if the temperature of the grease in the turning device 17 of the vehicle V exceeds the temperature at which the viscosity is sufficiently low.

Second Embodiment

The vehicle steering device 11 according to a second embodiment differs from the first embodiment in that an ambient temperature at the position where the vehicle V is placed is estimated and acquired from weather information (temperature information) received through the Internet.

Figure 3:
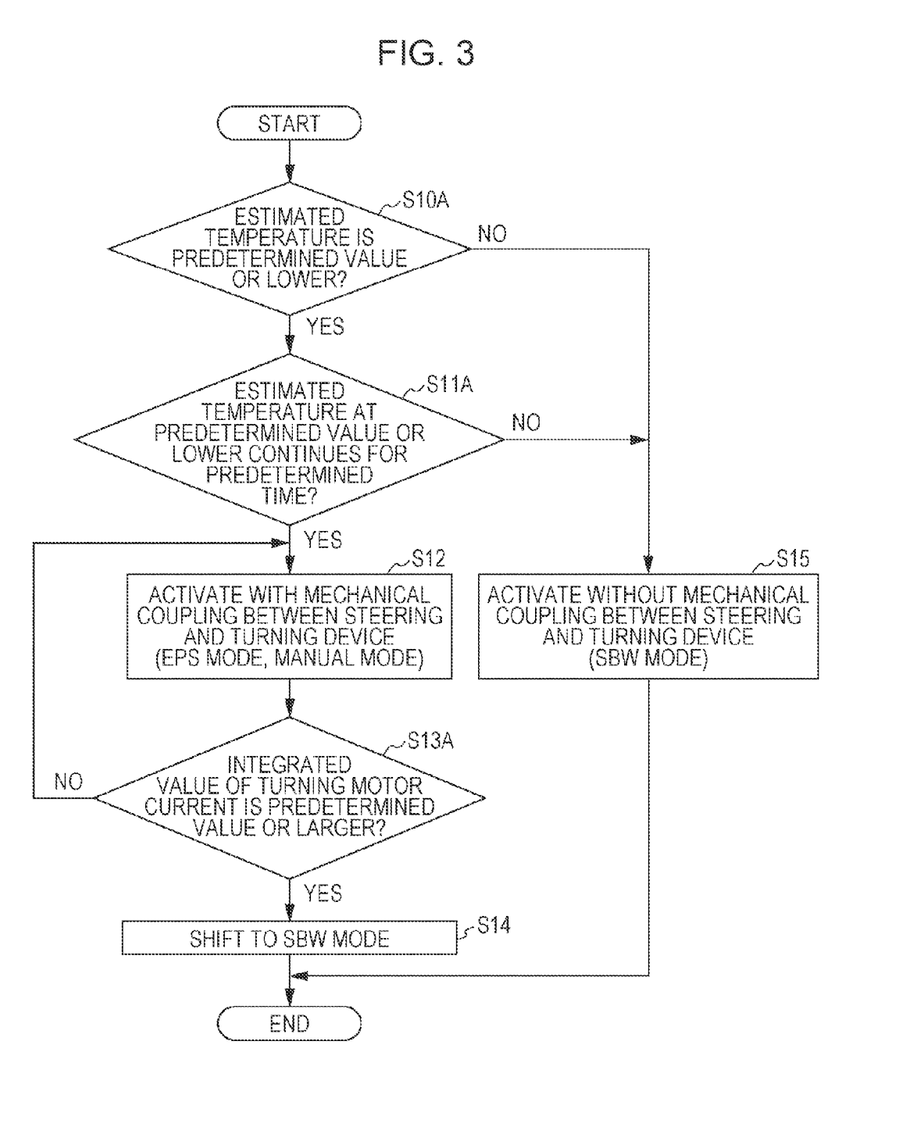
FIG. 3 is a flowchart showing an operation at activation according to a second embodiment.

FIG. 3 is a flowchart showing an operation at activation according to the second embodiment. The same reference sign is applied to the same element in the flowchart of the operation at activation of the first embodiment shown in FIG. 2.

When ignition of the vehicle is turned ON, the vehicle steering device 11 starts an operation at activation shown in FIG. 3.

In step S10A, the control device 40 estimates and acquires an ambient temperature of the vehicle V by the temperature acquisition unit 71, and determines whether or not the estimated temperature is a predetermined value or lower. If the estimated temperature is the predetermined value or lower (YES), the control device 40 executes processing in step S11A. If the estimated temperature exceeds the predetermined temperature (NO), the control device 40 executes processing in step S15. The temperature acquisition unit 71 of the second embodiment estimates and acquires an ambient temperature at the position where the vehicle V is placed based on weather information (temperature information) and current position information of the vehicle V received through the Internet by using a communication function of the navigation device 80.

In step S11A, the control device 40 determines whether or not the estimated temperature of the predetermined value or lower continues for a predetermined time. If the estimated temperature of the predetermined value or lower continues for the predetermined time (YES), the control device 40 executes processing in step S12. If this state does not continue for the predetermined time (NO), the control device 40 executes processing in step S15. By the processing in step S11A, it can be more accurately estimated that the viscosity of the grease in the turning device 17 has become low.

The processing in step S12 is similar to the processing in step S12 shown in FIG. 2.

In step S13A, the turning motor current integration unit 72 of the control device 40 calculates an integrated value of current flowing to the turning motor 29, and determines whether or not the integrated value is a predetermined value or larger. If the integrated value of current flowing to the turning motor 29 is the predetermined value or larger (YES), the control device 40 executes processing in step S14. If the integrated value of current is smaller than the predetermined value (NO), the control device 40 returns to the processing in step S12.

The current integrated value of the turning motor 29 is proportional to the amount of heat applied to the grease in the turning device 17 by driving of the turning motor 29. By using the current integrated value of the turning motor 29, a temperature rise of the grease in the turning device 17 is estimated, and it can be determined that the viscosity of the grease has become sufficiently low.

As the estimated temperature in step S10A is lower, it takes more time to decrease the friction of the turning device 17. Hence, the turning motor current integration unit 72 increases the predetermined value as the estimated temperature at activation is lower, to operate in the EPS mode for a longer time and apply heat by a larger amount to the grease in the turning device 17.

The processing in steps S14 and S15 are similar to the processing in steps S14 and S15 shown in FIG. 2.

With the processing in FIG. 3, the vehicle steering device 11 receives previous temperature information and temperature information at a past time when ignition of the vehicle V is turned OFF. The temperature acquisition unit 71 estimates and acquires the ambient temperature at the position where the vehicle V is placed from the temperature information, and if the estimated temperature is the predetermined value or lower, the activation is executed in the EPS mode different from the normal SBW mode. Further, the vehicle steering device 11 can shift the operation mode to the SBW mode after the integrated value of current flowing to the turning motor 29 becomes the predetermined value or higher and the friction of the turning gear box is decreased by a certain degree.

The temperature acquisition unit 71 may use temperature information of an external thermometer, air-conditioner operation information, seat-heater temperature rise characteristic information, tire pressure information, information of a tire pressure monitoring system (TPMS), and navigation information, for estimation of the ambient temperature at the position where the vehicle V is placed.

Since the tire pressure changes with temperature, the temperature acquisition unit 71 can estimate the ambient temperature from the tire pressure information. The information of TPMS contains temperature information of tires.

The navigation information is, for example, position information at the position where the vehicle V is placed, and current date and time information. The temperature acquisition unit 71 references a weather database based on the position information and the current date and time information, and can statistically estimate the current ambient temperature.

The vehicle steering device 11 may employ a configuration that calculates the current integrated value of the steering reaction force motor 16 by the reaction force motor current integration unit 75, and if the current integrated value of the steering reaction force motor 16 increases to a predetermined value, shifts the operation mode to the SBW mode. Even by the current integrated value of the steering reaction force motor 16, the amount of heat applied to the grease in the turning device 17 of the vehicle V is estimated, and it can be determined that the viscosity of the grease has become sufficiently low.

Advantageous Effects of Vehicle Steering Device 11 According to Aforementioned Embodiments A vehicle steering device 11 according to a first aspect includes a steering wheel (steering member) 13 operated by a driver to steer a vehicle V; a steering reaction force motor 16 that applies a reaction force to the steering wheel (steering member) 13; a turning device (turning mechanism) 17 that turns turning wheels 21a and 21b of the vehicle V by a turning motor 29; a clutch mechanism 19 that mechanically connects and disconnects the steering wheel (steering member) 13 with and from the turning device (turning mechanism) 17; a control device (control unit) 40 that provides control so that a turning angle is based on a steering angle of the steering wheel (steering member) 13; and a temperature acquisition unit (temperature acquisition section) 71 that can acquire a temperature by measuring or estimating the temperature. The vehicle steering device 11 mechanically couples the steering wheel (steering member) 13 and the turning device (turning mechanism) 17 and activates the steering wheel (steering member) 13 and the turning device (turning mechanism) 17 (in EPS mode, manual steering mode) if the temperature is a predetermined value or lower.

With the vehicle steering device 11 according to the first aspect, since the activation is executed in the EPS mode and the manual steering mode if the temperature is the predetermined value or lower, steering can be executed even at low temperatures without giving the driver uncomfortable feeling.

Also, in the vehicle steering device 11 according to a second aspect, the temperature acquisition section may include a temperature sensor (temperature measurement unit) 70 connected with the control device (control unit) 40.

With the vehicle steering device 11 according to the second aspect, the temperature sensor (temperature measurement unit) 70 can directly measure the temperature of the turning gear box.

Also, in the vehicle steering device 11 according to a third aspect, the temperature acquisition unit (temperature acquisition section) 71 may estimate an ambient temperature at the position where the vehicle V is placed based on any of temperature information of an external thermometer, air-conditioner operation information, seat-heater temperature rise characteristic information, tire pressure information, information of TPMS, information of a navigation device 80, and information received through the Internet.

With the vehicle steering device 11 according to the third aspect, since information while ignition of the vehicle V is turned OFF can be also acquired, the ambient temperature at the position where the vehicle V is placed can be more objectively estimated.

Also, in the vehicle steering device 11 according to a fourth aspect, if a state, in which the temperature is the predetermined value or lower, continues for a predetermined time or longer like when step S11 in FIG. 2 is YES, the steering wheel (steering member) 13 and the turning device (turning mechanism) 17 may be mechanically coupled and activated (EPS mode, manual steering mode) like step S12.

With the vehicle steering device 11 according to the fourth aspect, by checking that the temperature of the predetermined value or lower continues for the predetermined time or longer, it can be more accurately estimated that the viscosity of the grease in the turning device 17 has become low.

Also, in the vehicle steering device 11 according to a fifth aspect, after the steering wheel (steering member) 13 and the turning device (turning mechanism) 17 are mechanically coupled and activated (EPS mode, manual steering mode) like step S12 in FIG. 2, if the temperature acquired exceeds the predetermined value like when step S13 is NO, an operation mode may be shifted to a SBW mode in which the steering wheel (steering member) 13 and the turning device (turning mechanism) 17 are not mechanically coupled.

With the vehicle steering device 11 according to the fifth aspect, if the temperature of the grease in the turning device 17 of the vehicle V exceeds the temperature at which the viscosity is sufficiently low, the operation mode can be shifted to the SBW mode that is less affected by irregularities of a road surface.

Also, the vehicle steering device 11 according to a sixth aspect may further include a current sensor (turning motor current detection unit) 73 that detects a current value of the turning motor 29. In the vehicle steering device 11, after the steering wheel (steering member) 13 and the turning device (turning mechanism) 17 are mechanically coupled and activated (EPS mode, manual steering mode), if a current integrated value of the turning motor 29 becomes a predetermined value or larger like when step S13A is YES in FIG. 3, an operation mode may be shifted to a SBW mode in which the steering wheel (steering member) 13 and the turning device (turning mechanism) 17 are not mechanically coupled.

With the vehicle steering device 11 according to the sixth aspect, the amount of heat applied to the grease in the turning device 17 of the vehicle V is estimated by using the current integrated value of the turning motor 29, and it can be determined that the viscosity of the grease has become sufficiently low.

In the vehicle steering device 11 according to a seventh aspect, the steering wheel (steering member) 13 and the turning device (turning mechanism) 17 may be mechanically coupled and activated in an EPS mode.

With the vehicle steering device 11 according to the seventh aspect, since the activation is executed in the EPS mode at low temperatures, steering with the steering wheel 13 can be executed regardless of the viscosity of the grease in the turning device 17. Further, by driving the turning motor 29, heat can be applied to the grease in the turning device 17, and hence the viscosity of the grease can be rapidly decreased.

Also, in the vehicle steering device 11 according to an eighth aspect, at least two motors may be driven in the EPS mode.

With the vehicle steering device 11 according to the eighth aspect, since the at least two motors are driven in the EPS mode, steering with the steering wheel 13 can be executed with high power regardless of the viscosity of the grease in the turning device 17. Further, by driving the at least two motors, heat can be applied by a larger amount to the grease in the turning device 17 of the vehicle V, and hence the viscosity of the grease can be rapidly decreased.

Also, the vehicle steering device 11 according to a ninth aspect may further include a current sensor (reaction force motor current detection unit) 74 that detects a current value of the steering reaction force motor 16. In the vehicle steering device 11, after the steering wheel (steering member) 13 and the turning device (turning mechanism) 17 are mechanically coupled and activated (EPS mode), the steering reaction force motor 16 is driven in the EPS mode, and if a current integrated value of the steering reaction force motor 16 is increased to a predetermined value, an operation mode may be shifted to a SBW mode in which the steering wheel (steering member) 13 and the turning device (turning mechanism) 17 are not mechanically coupled.

With the vehicle steering device 11 according to the ninth aspect, the amount of heat applied to the grease in the turning device 17 of the vehicle V is estimated even by using the current integrated value of the steering reaction force motor 16, and it can be determined that the viscosity of the grease has become sufficiently low.

Other Embodiments

The above-described plurality of embodiments are implemented examples of implementation of this disclosure. Therefore, the technical scope of this disclosure should not be interpreted in a limited manner, because the disclosure can be implemented in various forms without departing from the scope and major features of this disclosure.

Also, in the description of the respective embodiments of this disclosure, the vehicle steering device 11 has the operation modes including the SBW mode, the EPS mode, and the manual steering mode; however, the disclosure is not limited to the example. The disclosure may be applied to a vehicle steering device with operation modes including the SBW mode and the EPS mode, or a vehicle steering device with operation modes including the SBW mode and the manual steering mode. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:
1. A vehicle steering device comprising:
a steering member operated by a driver to steer a vehicle;
a reaction force motor that applies a reaction force to the steering member;
a turning mechanism that turns turning wheels of the vehicle by a turning motor;
a clutch that mechanically connects and disconnects the steering member with and from the turning mechanism;
a control unit that provides control so that a turning angle is based on a steering angle of the steering member; and
a control device that acquires a temperature by measuring or estimating the temperature,
wherein, the control device determines, before activating the vehicle steering device, whether the temperature is a predetermined value or lower, and when the temperature is the predetermined value or lower, the steering member and the turning mechanism are mechanically coupled by the clutch and the vehicle steering device is activated with a manual steering mode or an electronic power steering mode, and when the temperature is higher than the predetermined value, the steering member and the turning mechanism are mechanically disconnected by the clutch and the vehicle steering device is activated with a steer by wire mode, wherein the temperature is a temperature around the turning mechanism, a temperature of a turning gear box of the turning mechanism, or an ambient temperature surrounding the vehicle.

2. The vehicle steering device according to claim 1, wherein the control device includes a temperature measurement unit connected with the control unit.

3. The vehicle steering device according to claim 2, wherein the temperature is the temperature of the turning gear box, and the temperature measurement device measures the temperature of the turning gear box.

4. The vehicle steering device according to claim 1, wherein the control device acquires the temperature by estimating the temperature based on any of temperature information of an external thermometer, air-conditioner operation information, seat-heater temperature rise characteristic information, tire pressure information, information of a tire pressure monitoring system, information of a navigation device, and information received through the Internet.

5. The vehicle steering device according to claim 4, wherein the temperature is the ambient temperature surrounding the vehicle.

6. The vehicle steering device according to claim 1, wherein, when a state, in which the temperature acquired by the control device is the predetermined value or lower, continues for a predetermined time or longer, the steering member and the turning mechanism are mechanically coupled and the vehicle steering device is activated with the manual steering mode or the electronic power steering mode.

7. The vehicle steering device according to claim 1, wherein, after the steering member and the turning mechanism are mechanically coupled and the vehicle steering device is activated, when the temperature acquired by the control device exceeds the predetermined value, an operation mode is shifted to the steer by wire mode in which the steering member and the turning mechanism are not mechanically coupled.

8. The vehicle steering device according to claim 1, further comprising:
a turning motor current detection device that detects a current value of the turning motor,
wherein, after the steering member and the turning mechanism are mechanically coupled and the vehicle steering device is activated, when a current integrated value of the turning motor becomes a predetermined value or larger, an operation mode is shifted to the steer by wire mode in which the steering member and the turning mechanism are not mechanically coupled.

9. The vehicle steering device according to claim 8, wherein the predetermined value is changed in accordance with the acquired temperature.

10. The vehicle steering device according to claim 1, wherein at least two motors are driven in the electronic power steering mode.

11. The vehicle steering device according to claim 10, further comprising:
a reaction force motor current detection device that detects a current value of the reaction force motor,
wherein, after the steering member and the turning mechanism are mechanically coupled and the vehicle steering device is activated, the reaction force motor is driven in the electronic power steering mode, and when a current integrated value of the reaction force motor is increased to a predetermined value, an operation mode is shifted to the steer by wire mode in which the steering member and the turning mechanism are not mechanically coupled.

12. The vehicle steering device according to claim 11, wherein the predetermined value is changed in accordance with the acquired temperature.

13. The vehicle steering device according to claim 10, wherein the at least two motors include the reaction force motor and the turning motor, and the at least two motors provide assist force for steering the vehicle.

14. A vehicle steering device comprising:
a steering member to steer a vehicle;
a reaction force motor that applies a reaction force to the steering member;
a turning mechanism that turns turning wheels of the vehicle by a turning motor;
a clutch that mechanically connects and disconnects the steering member with and from the turning mechanism;
a controller that controls the turning mechanism such that a turning angle of the turning wheels corresponds to a steering angle of the steering member; and
a control device that acquires a temperature by measuring or estimating the temperature,
wherein, the control device determines, before activating the vehicle steering device, whether the temperature is a predetermined value or lower, and when the temperature is the predetermined value or lower, the controller mechanically connects the steering member to the turning mechanism by the clutch and activates the vehicle steering device with a manual steering mode or an electronic power steering mode, and when the temperature is higher than the predetermined value, the controller mechanically disconnects the steering member and the turning mechanism by the clutch and activates the vehicle steering device with a steer by wire mode, and
wherein the temperature is a temperature around the turning mechanism, a temperature of a turning gear box of the turning mechanism, or an ambient temperature surrounding the vehicle.

15. The vehicle steering device according to claim 14, wherein the temperature is the temperature around the turning mechanism.

16. A method for controlling a vehicle steering device, the method comprising:
obtaining, by using a controller, a temperature as to a vehicle;
deciding, by using the controller, whether the temperature is a predetermined value or lower before activating the vehicle steering device; and
when the temperature is the predetermined value or lower, mechanically connecting, by using the controller, a steering member to a turning mechanism by a clutch and activating the vehicle steering device with a manual steering mode or an electronic power steering mode, and when the temperature is higher than the predetermined value, mechanically disconnecting the steering member and the turning mechanism by the clutch and activating the vehicle steering device with a steer by wire mode,
wherein the steering member steers the vehicle, the turning mechanism turns turning wheels of the vehicle by a turning motor, and
wherein the temperature is a temperature around the turning mechanism, a temperature of a turning gear box of the turning mechanism, or an ambient temperature surrounding the vehicle.

* * * * *